United States Patent [19]

Lauterbach et al.

[11] Patent Number: 4,460,284
[45] Date of Patent: Jul. 17, 1984

[54] TURBOCHARGER ASSEMBLY INCLUDING A FLEXIBLE ANTI-FRICTION BEARING SUPPORT

[75] Inventors: Jerre F. Lauterbach; Hans J. Schlamadinger, both of Columbus, Ind.

[73] Assignee: Cummins Engine Company, Inc., Columbus, Ind.

[21] Appl. No.: 337,088

[22] Filed: Dec. 31, 1981

[51] Int. Cl.³ .................. F16C 21/00; F01D 25/16
[52] U.S. Cl. .................. 384/126; 308/DIG. 14; 308/DIG. 15; 415/111
[58] Field of Search ............... 308/9, 35, 160, DIG. 1, 308/DIG. 14, 122, 240, 26, 184 A, 184 R, 187, DIG. 15; 417/407; 384/126, 101, 100, 397; 415/110, 111, 112, 113, 170 R; 184/6.11

[56] References Cited

U.S. PATENT DOCUMENTS

| | | | |
|---|---|---|---|
| 2,345,952 | 4/1944 | Smith | 308/189 R |
| 2,700,581 | 1/1955 | Migny | 308/238 |
| 3,043,636 | 7/1962 | MacInnes | 308/121 |
| 3,056,634 | 10/1962 | Woollenweber, Jr. et al. | 308/78 |
| 3,090,544 | 5/1963 | Woollenweber | 308/DIG. 15 X |
| 3,273,948 | 9/1966 | Hoddy | 308/26 X |
| 3,311,431 | 3/1967 | Hilliard | 308/DIG. 14 X |
| 3,390,926 | 7/1968 | Woollenweber | 308/DIG. 15 X |
| 3,411,706 | 11/1968 | Woollenweber | 308/35 X |
| 3,637,272 | 1/1972 | Christiansen | 308/35 X |
| 4,009,972 | 3/1977 | Sarle | 417/407 |
| 4,324,440 | 4/1982 | Steigenberger | 308/DIG. 15 X |
| 4,370,106 | 1/1983 | Lauterbach | 384/126 X |

*Primary Examiner*—Stuart S. Levy
*Assistant Examiner*—David Werner
*Attorney, Agent, or Firm*—Sixbey, Friedman & Leedom

[57] ABSTRACT

A turbocharger assembly including a flexible anti-friction bearing support to prevent loss of gripping interference at high temperatures and destructive compressive loads at low temperatures. A simplified hydrodynamic fluid (such as lubrication oil) supply is disclosed for providing lubricating oil to the anti-friction bearing and hydrodynamic fluid to a hydrodynamic sleeve bearing. A novel end plate design permits limited radial movement of the bearing support while resisting axial thrust loads of the turbo shaft.

7 Claims, 11 Drawing Figures

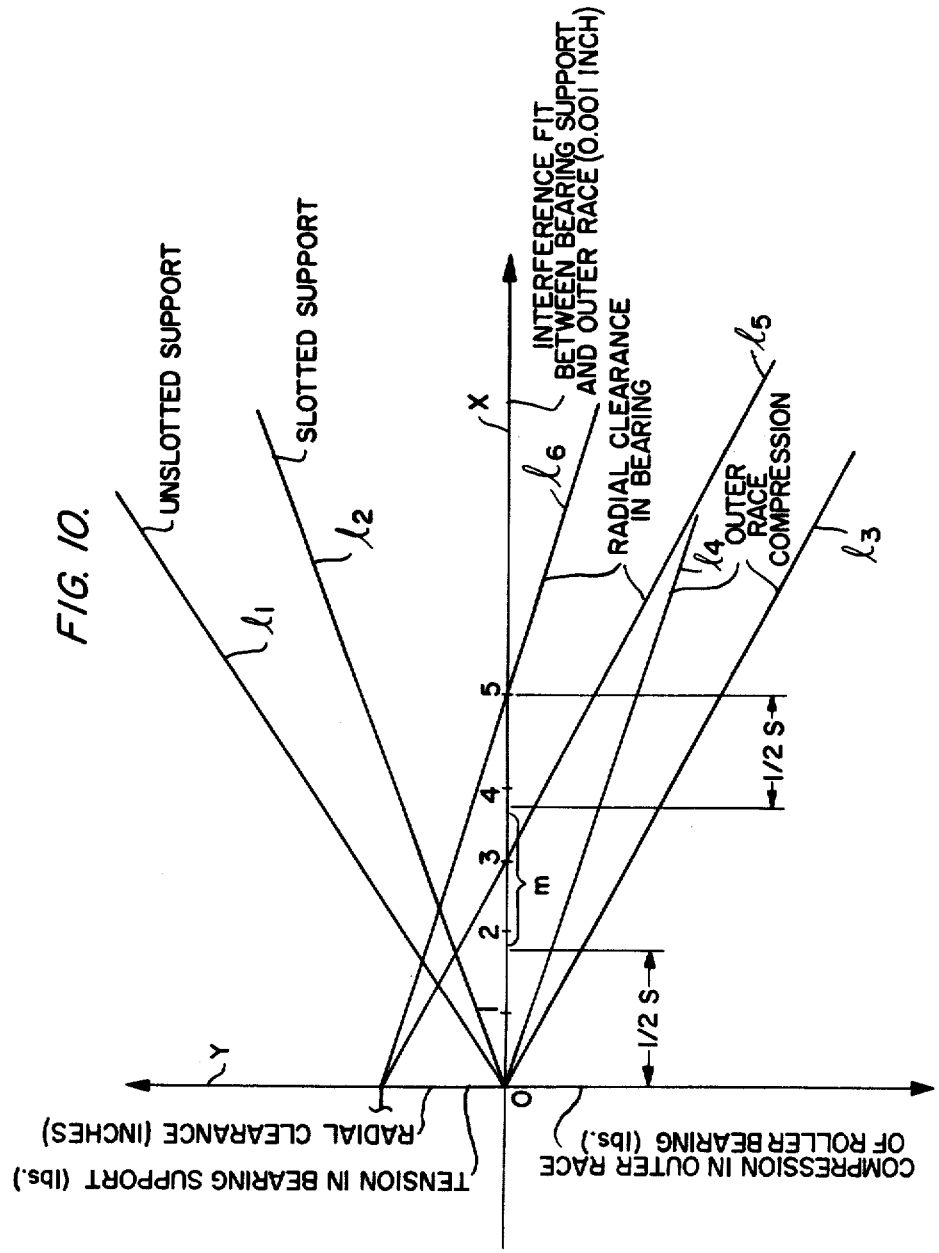

TURBOCHARGER ASSEMBLY INCLUDING A FLEXIBLE ANTI-FRICTION BEARING SUPPORT

Technical Field

This invention relates to a turbocharger assembly including an inexpensive support arrangement for a hybrid hydrodynamic anti-friction bearing support which avoids loss of gripping interference and destructive compressive loads in the anti-friction bearing over a broad temperature range.

Background Art

The difficult technical problems associated with providing suitable bearings for a turbocharger rotor derive primarily from the very high operating speeds (in excess of 100,000 rpm) and the extremely broad temperature range over which the turbocharger bearings must operate (in excess of 400 Fahrenheit degrees). As illustrated in U.S. Pat. Nos. 3,056,634 and 3,043,636, a hydrodynamic "floating sleeve" bearing has been developed in an attempt to overcome the problems associated with rotor imbalance at high speed. In particular, hydrodynamic sleeve bearings are used in turbocharger assemblies to provide a film of lubricant between the shaft and sleeve bearing to support rotation of the shaft and to provide another film of lubricant between the bearing and stationary support to permit viscous damping of the radial swinging movement of the shaft induced at high speed by the inherent difference between the mass and geometric centers of the shaft. While useful for this purpose, hydrodynamic sleeve bearings involve frictional losses which are in excess of those involved with the use of conventional anti-friction bearings (such as ball or roller bearings). Nevertheless, roller or ball bearings have not been generally employed in turbocharger shaft mountings because the high temperatures existent at the turbine end of the turbocharger shaft result in lubricant breakdown and an unacceptable shortening of bearing life.

The hybrid combination of a hydrodynamic sleeve bearing and ball bearing for the turbocharger shaft would appear to provide an ideal solution. However, practical difficulties have been encountered in the implementation of a hybrid bearing design. In particular, the material out of which the floating support is made must normally be the same as the material of which the stationary support is made. By observing this constraint, the size of the hydrodynamic bearing clearance space remains constant over the entire operating temperature range of the turbocharger. For practical reasons, the turbocharger housing (and therefore the bearing support) is normally made of an aluminum based alloy having a relatively high thermal coefficient of expansion while the races of an anti-frictional bearing are normally formed of precision steel alloy having a much lower thermal coefficient of expansion. Therefore, substantial differential size changes will occur between the antifriction bearing and the support in which it is mounted upon substantial temperature change. It may be impossible, using conventional mounting techniques, to avoid loss of interference and/or destructive compressive forces between the floating bearing support and the anti-frictional bearing throughout the entire operational temperature range of a turbocharger which, as noted above, may be in excess of 400 Fahrenheit degrees.

Attempts have been made to overcome the problems associated with using distinct materials having greatly differing thermal coefficients of expansion in anti-friction bearing assemblies. For example, U.S. Pat. No. 2,700,581 discloses the interposition of a third material between the outer race and the surrounding support in order to equalize the apparent thermal coefficients between the bearing race and its support over a broad temperature range. While effective for the purpose disclosed, this approach would be prohibitively expensive if applied to a high volume product such as a turbocharger assembly. In a somewhat different environment in which the outer race of an anti-frictional bearing is caused to move axially with respect to an aluminum supporting hub, it is known, as disclosed in U.S. Pat. Nos. 2,345,952 to split the supporting hub to form cantilevered supporting fingers designed to maintain a "press fit" between the outer race and suporting hub while permitting "axial" movement therebetween. This solution would not apply to a turbocharger bearing since the turbo shaft must be retained in a fixed axial position to avoid destructive contact between the turbine and compressor wheels and the housings in which each are mounted.

A practical hybrid bearing assembly for use over a broad temperature operating range has not been disclosed in the prior art.

Disclosure of the Invention

It is a primary object of the subject invention to overcome the deficiencies of the prior art as indicated above and provide a flexible anti-friction bearing support which avoids loss of interference and destructive compressive loads in the antifriction bearing over a broad temperature range, for example, in excess of 400 Fahrenheit degrees.

It is a more particular object of this invention to provide a hybrid bearing assembly for supporting a high speed shaft on a base including a floating bearing support hydrodynamically mounted in a stationary support wherein the bearing support includes a hydrodynamic sleeve bearing and an interior cavity shaped to form an interference fit with the exterior of an anti-friction bearing wherein expansion control means surrounds the interior cavity to cause the interior surface to grip the outer race of the antifriction bearing with a sufficient frictional force to prevent relative rotational movement while preventing excessive radial compressive forces over an operating range in excess of 400 Fahrenheit degrees.

Yet another object of the subject invention is to provide a hybrid bearing assembly for a high speed shaft including a floating bearing support having a hydrodynamic sleeve bearing and an anti-friction bearing receiving cavity formed, in part, by cantilevered segments resiliently supporting the outer race of the anti-friction bearing combined with retention means for preventing relative axial movement of the outer race with respect to the bearing support.

Still another object of the subject invention is to provide a turbocharger assembly for an internal combustion engine including a combined hydrodynamic sleeve bearing and anti-friction bearing support including expansion control means surrounding an interior cavity designed to form an interference fit with an anti-friction bearing in a manner to radially grip the exterior of the anti-friction bearing to prevent relative rotational movement without imposing a destruction compressive force on the anti-friction bearing over an extremely broad operating temperature range even though the outer race of the anti-friction bearing has a thermal coefficient of expansion which is significantly less than the thermal coefficient of expansion of the anti-friction bearing support.

It is still another object of the subject invention to provide a hybrid hydrodynamic sleeve bearing and anti-friction bearing support for mounting within the housing of a turbocharger in which a simplified arrangement of hydrodynamic fluid supply passages are formed within the bearing assembly to provide the necessary hydrodynamic fluid to the sleeve bearing and lubricating fluid to the anti-friction bearing.

It is yet another object of the subject invention to provide a hybrid hydrodynamic sleeve bearing and anti-friction bearing support combined with a turbocharger housing having an end plate shaped to prevent rotational movement of the bearing support while permitting limited "floating" movement of the hydrodynamic sleeve bearing and to provide thrust receiving pads for engagement with the axial end face of the anti-friction bearing support to provide low frictional contact in the direction of the normal axial thrust load on the turbocharger shaft.

Other and more specific objects of the subject invention may be appreciated by a consideration of the following Brief Description of the Drawings and Best Mode for Carrying Out the Invention.

Brief Description of the Drawings

FIG. 10 is a chart comparing the performance of the subject anti-friction bearing support with the performance of a conventional anti-friction bearing support.

Best Mode for Carrying Out the Invention

Figure 1:
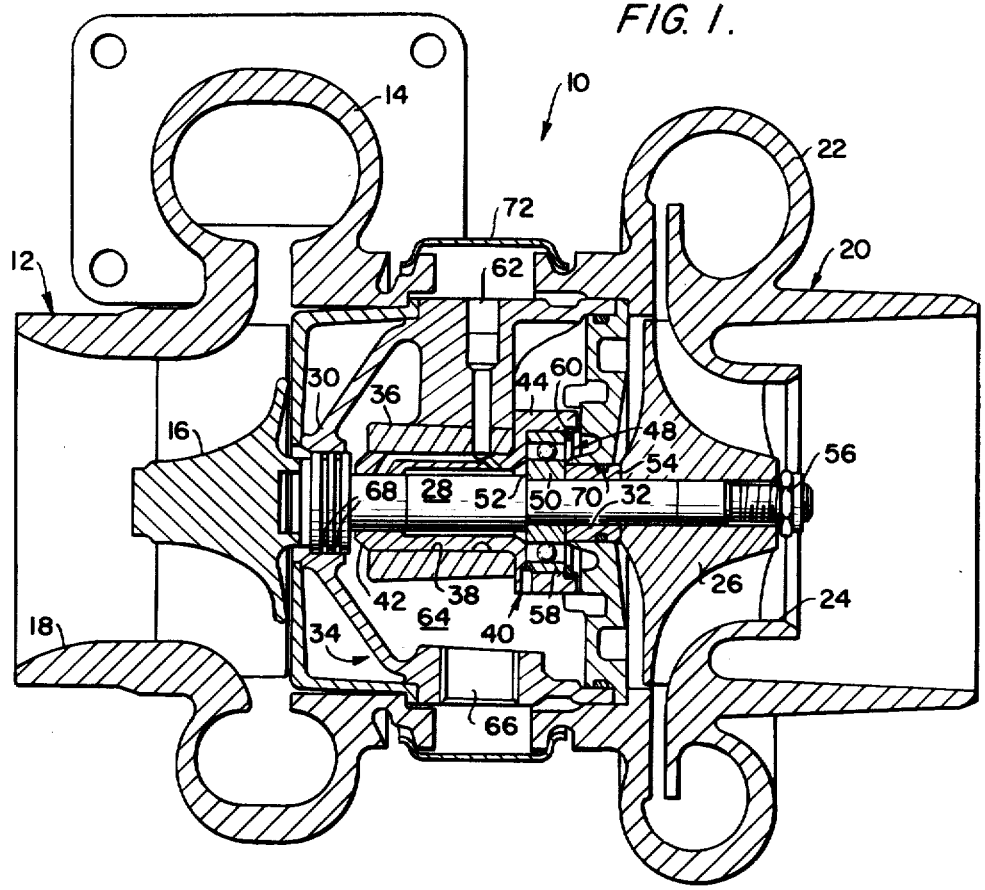
FIG. 1 is a cross-sectional view of a turbocharger assembly including a flexible anti-friction bearing support designed in accordance with the subject invention.

For a clear understanding of the subject invention, reference is initially made to FIG. 1 in which a turbocharger assembly 10 designed in accordance with the subject invention is illustrated. In particular, the turbocharger assembly 10 includes a turbine 12 arranged to receive a working fluid, such as the exhaust from an internal combustion engine, through a turbine scroll 14 designed to feed the working fluid into a turbine wheel 16 for imparting rotational movement thereto as the working fluid is exhausted through a turbine outlet 18. The turbine 12 is designed to provide drive to a compressor 20 formed by a compressor scroll 22 provided with an inlet 24 through which gas (such as atmospheric air) flows to a compressor wheel 26 driven by the turbine for propelling the inlet gas into the compressor scroll 22 for collection and passage to a compressed gas utilization device such as the intake manifold of an internal combustion engine.

Turbine wheel 16 and compressor wheel 26 are mounted, respectively, on the ends of a turbo shaft 28 which passes through the aligned openings 30 and 32 formed in opposed sides of a bearing housing 34. Fixed within bearing housing 34 is a stationary support 36 containing a bore 38 aligned generally with openings 30 and 32. In order to support the shaft 28 within bearing housing 34, a floating bearing support 40, designed in accordance with the subject invention, is provided for hydrodynamically retaining shaft 28.

Floating bearing support 40 includes a hydrodynamic sleeve bearing 42 of the type disclosed in U.S. Pat. No. 4,370,106. As will be described hereinbelow, the fluid flow passages through the hydrodynamic sleeve bearing illustrated in FIG. 1 have been significantly simplified over those illustrated in the above-mentioned patent. Connected with the hydrodynamic sleeve bearing 42 is an anti-friction bearing support 44 received within a pocket formed within bearing housing 34 between stationary support 36 and a radially oriented end plate 46. The axial length of the pocket receiving the anti-friction bearing support 44 is slightly greater than the axial length of the bearing support 44 to permit the floating bearing support 40 to move slightly within the radial constraints imposed by the film of hydrodynamic fluid, such as engine lubricating oil, which is supplied to the predetermined clearance formed between hydrodynamic fluid bearing 42 and stationary support 36. This slight degree of freedom allows the shaft 28 and the wheels mounted thereto to swing or oscillate around the geometric longitudinal axis of the bore 38 formed in stationary support 36 while at the same time the film formed between sleeve bearing 42 and stationary support 36 operates to provide a viscous damping to the overall system. The compressor end of shaft 28 is supported within floating bearing support 40 by means of an anti-friction bearing 48 including an inner race 50 axially locked onto shaft 28 by being biased against shaft shoulder 52 by means of spacer sleeve 54 and compressor wheel 26 held in place by nut 56 threadedly engaged with shaft 28. Outer race 58 is held within an open ended cylindrical interior cavity contained in anti-friction bearing support 44 by means of an interference fit. To insure that no axial movement between outer race 58 and antifriction bearing support 44 occurs, the resiliently biased C-ring 60 is positioned within a radial groove within the cavity receiving the anti-friction bearing adjacent the edge of the outer race.

As will be explained in greater detail hereinbelow, a hydrodynamic fluid, such as lubricating oil, is supplied to the hydrodynamic sleeve bearing 42 and anti-friction bearing through a fluid supply passage 62 contained in compressor housing 34. The fluid passing out of these bearings is collected within the interior space 64 of the turbine housing and exits through a drain passage 66 as illustrated in FIG. 1 at the bottom of turbine housing 34. To insure that fluid does not leak through openings 30 and 32, flexible seals 68 and 70 are positioned between shaft 28 and openings 30 and 32, respectively. Seals 68 and 70 are sufficiently resilient that they do not impose restraint on the freedom of radial movement permitted to shaft 28 by the hydrodynamic sleeve bearing 42.

The compressor and turbine assemblies are held in fixed contact with turbine housing 34 by means of a V band clamp 72, the opposed lateral edges of which are shaped to bias the compressor and turbine axially toward the turbocharger housing 34 disposed therebetween.

Figure 2:
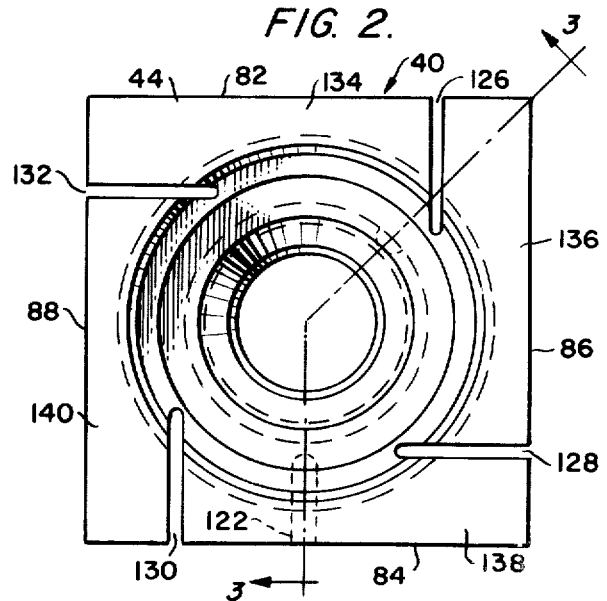
FIG. 2 is an end elevational view of a floating bearing support designed in accordance with the subject invention.
Figure 3:
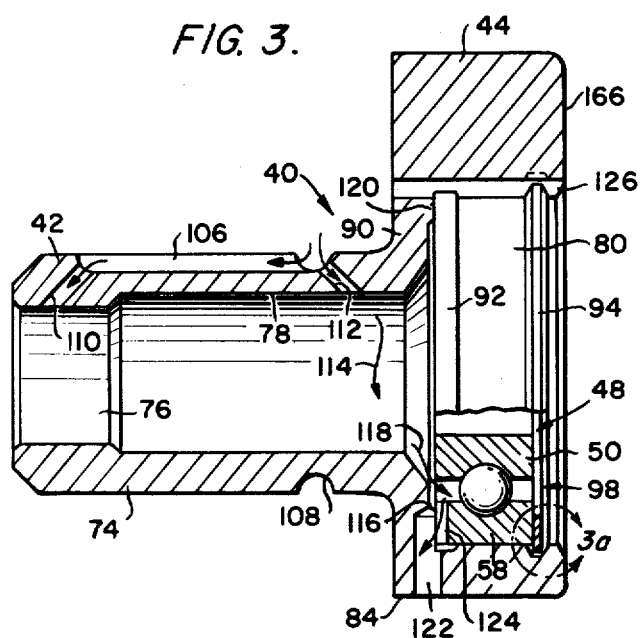
FIG. 3 is a cross-sectional view of the bearing support illustrated in FIG. 2 taken along lines 3—3.

Reference is now made to FIGS. 2 and 3 for a more detailed description of the design and operation of the floating bearing support 40. As noted above, the floating bearing support 40 includes a hydrodynamic sleeve bearing 42 which, as illustrated best in FIG. 3, is formed from a hollow cylindrical extension 74. The interior of extension 74 includes a cylindrical bearing surface 76 shaped to form a slight clearance with the corresponding portion of shaft 28 to allow a film of fluid such as lubricating oil to be held in the resulting space. The remaining portion of extension 74 includes a recess 78 of larger diameter than cylindrical bearing surface 74. Connected with extension 74 is the anti-friction bearing support 44 containing an interior cavity 80 which is generally cylindrical in shape but has a longitudinal axis aligned with the longitudinal axis of cylindrical bearing surface 76 and the nominal position of the longitudinal axis of shaft 28. For reasons which will be explained more fully below, the interior cavity 80 communicates at one end with cylindrical recess 78 and is opened at the opposite end to receive the anti-friction bearing 48 shown in partially broken away cross-sectional view in FIG. 3. As noted above, anti-friction bearing 48 includes an inner race 50 adapted to be mounted integrally and concentrically on shaft 28 while the outer race 58 is formed within a manufacturing tolerance which insures an interference fit with the interior cavity 80.

Figure 3A:
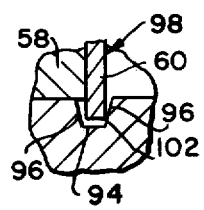
FIG. 3a is an enlarged partial cross-sectional view of the means for retaining an anti-frictional bearing in the anti-friction bearing support taken along lines 3a—3a of FIG. 3.

Anti-friction bearing support 44 is formed with a non-circular exterior configuration as best illustrated in FIG. 2. In particular, the exterior of support 44 includes two pair of opposed planar surfaces 82, 84 and 86, 88. For reasons which will be explained below, the first pair of planar surfaces 82,84 are accurately machined to fairly close tolerances while the second pair of planar opposed surfaces 86,88 need not be accurately machined. FIG. 3a shows in crosssection that the shape of interior cavity 80 results in the formation of planar wall 90 at one end of anti-friction bearing support 44 whereas the other side of interior cavity is open to receive the antifriction bearing 48. Because planar wall 90 imposes more restraint on the adjacent portion than on the more remote portion of the inner surface of cavity 80, a first radial (relief) groove 92 is formed in the portion of the interior surface of cavity 80 which is immediately adjacent planar wall 90. Radial groove 92 tends to release the strain adjacent the juncture of planar wall 90 and the remaining portion of antifriction bearing support 44 when an anti-friction bearing is placed within interior cavity 80. An alternative technique for releasing the greater stresses at this location is to form the cylindrical portion of the inner surface of interior cavity 80 such that it has a slightly greater diameter adjacent planar wall 90 then at the opposed open side of the cavity. Relief groove 92 may also serve to assist in draining lubricating fluid from the anti-friction bearing as will be explained more fully below.

To securely retain the outer race 58 of an antifriction bearing within interior cavity 80, a second radial groove 94 is formed in the surface of interior cavity 80 at a distance from planar wall 90 which is approximately equal to the axial width of outer race 58. The shape and position of radial groove 94 is illustrated in greater detail in FIG. 3a wherein it is shown that groove 94 has sloped side walls 96. As further shown in FIGS. 3 and 3a, outer race 58 may be held in position by retention means 98 in the form of a C-shaped snap ring 60 arranged to expand resiliently into radial groove 94 such that the radial outermost edge of expansion ring 60 engages one of the sloped side walls 96 while the opposite side of expansion ring 60 is biased against the outer race 58.

Hydrodynamic fluid, in the form of lubrication oil, is applied to and flows through the floating bearing support 40 as illustrated by the arrows in FIG. 3. In particular, hydrodynamic fluid is first applied to a circumferential groove 108 formed in the exterior surface of cylindrical extension 74 which communicates with a longitudinal groove 106 designed to feed lubricating oil into the clearance space between the exterior surface of cylindrical extension 74 and the interior surface of bore 38 formed in stationary support 36 (FIG. 1). A first radial passage 110 contained in cylindrical extension 74 communicates at one end with longitudinal groove 106 and at the other end with the clearance space between cylindrical bearing surface 76 and the corresponding portion of shaft 28. A second radial passage 112 communicates at one end with longitudinal groove 106 and at its other end with the cylindrical recess 78 to form a flow passage for lubricating fluid surrounding shaft 28. As shown by arrows 114, the lubricating fluid within this flow passage may pass into interior cavity 80. Planar wall 90 contains a small axial recess 116 which insures a flow path for oil into the space between the inner and outer races of the anti-friction bearing 48. Thus, lubricating oil is allowed to flow as shown by arrow 118 into the anti-friction bearing 48 to insure that it is properly lubricated during operation. It should be noted that axial recess 116 does not extend to the full diameter of interior cavity 80 thereby forming a shoulder 120 against which the outer race 58 comes into contact when the anti-friction bearing 48 is press fitted into the interior cavity 80. This insures that a flow path is open for lubrication oil into the antifriction bearing 48. A drainage passageway formed by means of a radially oriented drain passage 122 extends from the exterior planar surface 84 into the relief groove 92. Lubrication fluid passes from the space between the inner and outer races of anti-friction bearing 48 into groove 92 by means of a radial slot formed in outer race 58 as will be described in more detail with reference to FIGS. 8 and 9.

Because of the critical nature of the clearance space formed between the exterior of cylindrical extension 74 and the interior surface of bore 38 formed in stationary support 36, it is found to be desirable to form bearing support 40 out of the same material of which stationary support 36 is formed. By this technique, the clearance space will maintain a more nearly constant dimension throughout the large temperature operating range as is normally experienced by a turbocharger of the type used on internal combustion engines. For practical reasons, these components need to be formed of castable material such as aluminum based alloys which will have a much greater thermal coefficient of expansion that the anti-friction bearing races which are formed of precision steel alloys to achieve desired operating characteristics. Inherently, therefore, a large difference will exist in the thermal coefficient of expansion between the anti-friction bearing and the material of which bearing support 40 is formed. In such circumstances, the interior cavity diameter will inherently grow faster than the outer race diameter with increasing operating temperature. When the operating range (normally in excess of 400 Fahrenheit degrees) is considered, no degree of manufacturing tolerance is capable of insuring that the outer race 58 will be held against rotation at high temperature and will avoid excessive compressive loading at low temperature. To overcome this problem, bearing support 44 has been subdivided by four longitudinal slots 126, 128, 130 and 132 parallel to the longitudinal axis of interior cavity 80 and oriented perpendicularly with respect to the planar opposed surfaces 82, 86, 84 and 88, respectively. Longitudinal slots 126 through 132 extend inwardly sufficiently to intersect interior cavity 80 to form a plurality of segments 134, 136, 138 and 140 supported in cantilevered fashion on planar wall 90. Each cantilever mounted segment includes an interior arcuate surface which collectively define the interior cylindrical surface of interior cavity 80. The exact number and shape of slots which is required in order to impart the desired resilient characteristics to the anti-friction bearing support 44 will vary from one support design to another. However, the four slots as shown in FIG. 2 have been found to be of particular advantage when the exterior shape of the support is generally rectangular since the slots may be offset slightly to pass through the thicker radially extending portions of the support 44 adjacent each corner. Collectively, segments 134–140 form an expansion control means surrounding interior cavity 80 for causing the inner surface of cavity 80 to grip radially the outer race 58 to prevent rotational movement without imposing excessive compressive force throughout an operating temperature range in excess of 400 Fahrenheit degrees. The beneficial effects achieved by the support design illustrated in FIGS. 2 and 3 will be discussed in greater detail with reference to FIG. 10.

Figure 4:
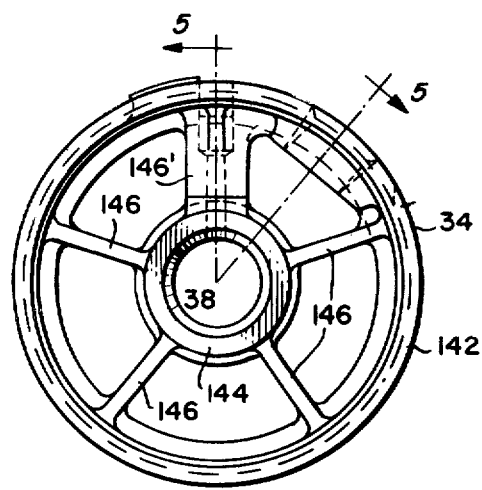
FIG. 4 is an end elevational view of the turbocharger housing and stationary support designed in accordance with the subject invention.
Figure 5:
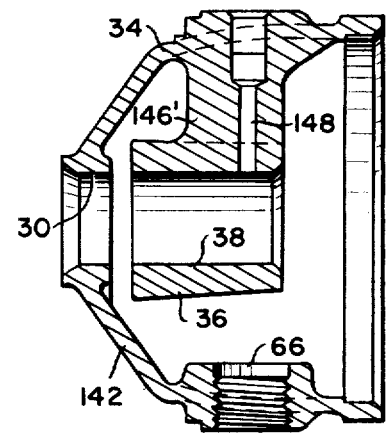
FIG. 5 is a cross-sectional view of the turbocharger housing and stationary support taken along lines 5—5 of FIG. 4.

Reference is now made to FIGS. 4 and 5 which disclose one portion of turbocharger housing 34 including hollow outer portion 142 having a generally circular cross-section as illustrated in FIG. 4 within which is mounted a boss 144 secured by means of a plurality of spoke-like webs 146 to hold boss 144 in a stationary position. As noted with respect to FIG. 1, boss 144 and webs 146 provide a stationary support 36 through which is formed a bore 38 aligned with an opening 30 as illustrated in FIG. 5. The opening 30 and bore 38 are shaped to receive shaft 28 as supported by floating bearing support 40. It should be noted that the scale of bearing support 40 illustrated in FIGS. 2 and 3 is larger than the scale of the turbocharger housing illustrated in FIGS. 4 and 5. A supply for hydrodynamic fluid (such as lubricating oil) is provided through a passage 148 formed in one of the webs 146'. As shown in FIG. 5, passage 148 communicates with the exterior of housing 34 at one end and with bore 38 at the other end. Passage 148 is aligned generally with circumferential groove 108 to insure a flow path connection between passage 148 and longitudinal groove 106 of the bearing support 40.

Figure 6:
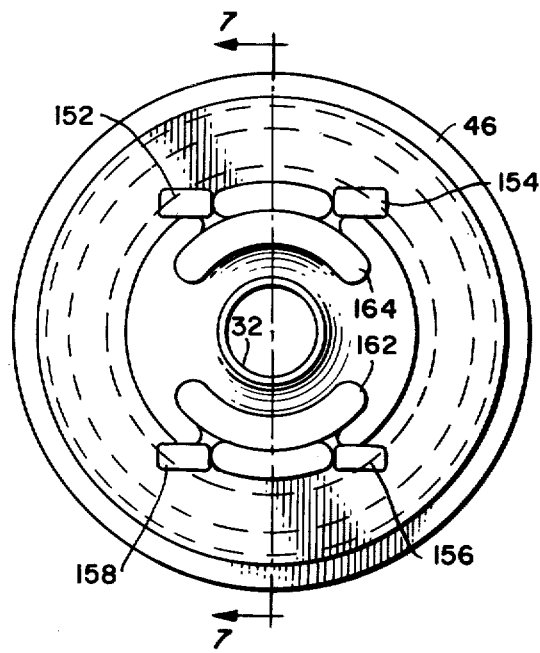
FIG. 6 is a top elevational view of the end plate of the turbocharger housing designed in accordance with the subject invention.
Figure 7:
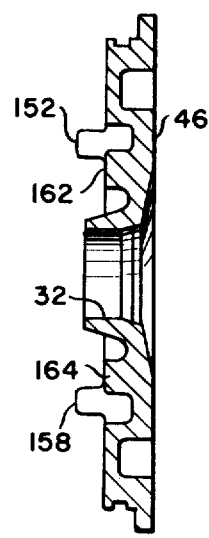
FIG. 7 is a cross-sectional view of the end plate illustrated in FIG. 6 taken along lines 7—7.

One end of the housing portion illustrated in FIG. 5 is opened and adapted to mate with the remaining housing portion illustrated in FIGS. 6 and 7. This remaining portion of the turbocharger housing takes the form of an end plate 46, the perimeter of which is adapted to mate with and seal the open end of the housing portion illustrated in FIG. 5. End plate 46 contains opening 32 centrally located to align with bore 38 and opening 30 as illustrated in FIG. 5. The inside face of end plate 46 is characterized by the provision of four axially extending projections 152, 154, 156 and 158. These projections are positioned as best illustrated in FIG. 6 so as to engage opposed planar surfaces 82 and 84 of the anti-friction bearing support 44. As such, projections 152 through 158 constitute rotation restraining means for engaging the non-circular exterior of the antifriction bearing support to prevent substantial rotation thereof. It should be noted, however, that projections 152 through 158 must be carefully positioned so as to permit at least limited movement of the bearing support 40 within the limits permitted by the hydrodynamic sleeve bearing 42. In addition to the retention means, the inside of end plate 46 further includes thrust receiving means 160 in the form of a pair of raised arcuate pads 162 and 164. These pads may be coated with TEFLON or other anti-friction material and are carefully shaped to engage the end face 162 of the anti-friction support 44 (FIG. 3). Normally an axial thrust in the direction toward the compressor will be imposed on shaft 28 which is transmitted through anti-friction bearing 48 (which is designed to accommodate both axial and radial thrust) into the anti-friction bearing support 44 which is then biased into the arcuate pads 162 and 164. The axial length between the end face of stationary support 36 must be slightly greater than the axial length of anti-friction bearing support 44 to form a retention pocket so as to permit the limited radial movement necessary for proper operation of the hydrodynamic sleeve bearing 42.

Figure 8:
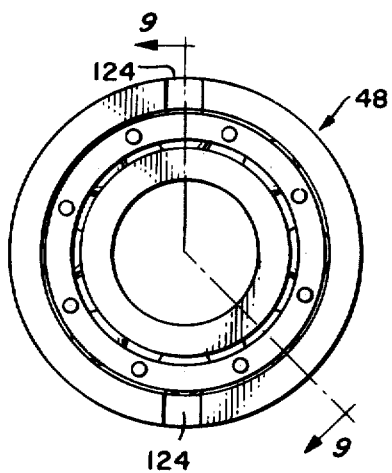
FIG. 8 is a side elevational view of an antifrictional bearing designed for use in the bearing support illustrated in FIGS. 2 and 3.
Figure 9:
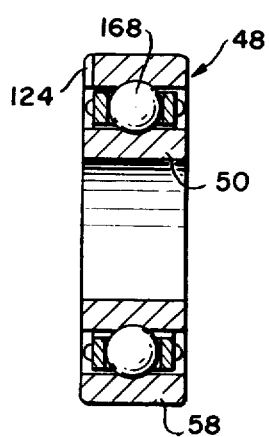
FIG. 9 is a cross-sectional view of the antifrictional bearing illustrated in FIG. 8 taken along lines 9—9.

FIGS. 8 and 9 disclose in more detail the antifriction bearing 48 designed in accordance with the subject invention wherein anti-friction elements 168 (roller bearings) are disposed between the inner and outer races 50 and 58, respectively. As illustrated in FIG. 8, outer race 58 may have one or more radial slots 124 to accommodate drainage of lubrication fluid from the space between the inner and outer races.

Referring now to FIG. 10, the advantages of the turbocharger assembly including a flexible anti-friction bearing support is evident from the illustrated graph. The X axis defines the differential in diameters of the interior cavity and the exterior surface of the outer race at any given moment. Thus the zero point along the X axis would indicate that the interior cavity diameter and the outer race diameter were equal. Line $l_1$ represents the tension which would exist in the anti-friction bearing support for any given level of interference fit represented along the X axis. Line $l_2$ shows the effect of slotting the anti-friction bearing support to increase its resilience and thus reduce the existing tension therein. Line $l_3$ represents the compressive force existent within the outer race of the anti-friction bearing for a given interference fit when the antifriction bearing support is unslotted. This level of compressive force should be compared with that represented by line $l_4$ which results when the antifriction bearing support is slotted in accordance with the teachings of the subject invention.

The compression forces on the outer race have the effect of decreasing the actual working clearance between the anti-friction elements (ball bearings) and the bearing races. This fact is illustrated in FIG. 2 by line $l_5$ which shows the plot of radial clearance as a function of the interference fit. Thus, line $l_5$ starts at the Y axis with a given manufacturing working clearance and slopes downwardly as compression on the outer race increases for a given interference fit between the anti-friction bearing support and the outer race of the bearing. For an unslotted support structure, the actual working clearance might, for example, decrease to zero when the interference fit reaches 0.003 inches. In comparison to this, by providing a slotted anti-friction bearing support, the actual working clearance between the anti-friction element and the respective bearing races might not be reduced to zero until the actual interference fit between the outer bearing race and the interior cavity reaches 0.005 inches, assuming the thermally induced differential expansion between the outer bearing race and the anti-friction bearing support is equal to greater than 0.003 inches. It is apparent than an unslotted support cannot possibly accommodate an anti-friction bearing over the full operating range of temperatures without either loss of frictional interference fit between the interior friction bearing and the support or destruction of the operating clearance between the anti-friction element and the bearing races. By providing a slotted support, a manufacturing tolerance in excess of 0.001 inches is permissible while accommodating the full thermally induced change in diameter differential between the bearing support and the outer race.

Industrial Applicability

The subject flexible anti-friction bearing support will have application wherever it is desired to mount a rotating shaft by means of an anti-friction bearing for operation over an extremely large temperature range. The disclosed invention has particularly utility in the environment of turbochargers for use on internal combustion engines. The disclosed invention has still more particular utility for use in high speed turbochargers employing hydrodynamic sleeve bearings adjacent the turbine end of the turbocharger unit.

We claim:

1. A hybrid bearing assembly for supporting a high speed shaft on a base through an anti-friction bearing having an inner race and an outer race separated by anti-frictional elements having a predetermined working clearance and having an exterior dimension which is within a known manufacturing tolerance, comprising
   (a) a stationary support adapted to be rigidly connected with the base,
   (b) a floating bearing support hydrodynamically supported within said stationary support for limited rotational movement due to differences in the geometric and mass centers of rotation of the shaft and being formed of material having a thermal coefficient of expansion which is greater than the thermal coefficient of expansion of the outer race, said floating bearing support including:
       (1) a hydrodynamic sleeve bearing for supporting one end of the shaft structure for rotation within said stationary bearing support,
       (2) a planar wall and a plurality of segments mounted in cantilevered fashion to said planar wall, said segments having inside arcuate surfaces defining an interior cavity shaped to form an interference fit with the exterior of the outer race within a predetermined manufacturing tolerance, and
       (3) expansion control means surrounding said interior cavity, including a planar wall and a plurality of segments mounted in cantilevered fashion to said planar wall, said segments having inside arcuate surfaces which define said interior cavity, for causing the surface of said interior cavity to grip radially the outer race with a sufficient frictional force to prevent relative rotational movement between said floating bearing support and the outer race throughout an operating temperature range spanning an excess of 400° F. without imposing on the outer race a radial compressive force sufficient to eliminate the predetermined working clearance between the inner and outer races, said expansion control means being formed in said floating bearing support between a pair of opposed parallel exterior surfaces and by four elongated slots separating said segments, said slots being parallel to the longitudinal axis of said interior cavity and being arranged generally perpendicularly to said exterior surfaces, respectively; and
   (c) retention means for preventing relative axial movement of the outer race and said bearing support.

2. A turbocharger assembly for an internal combustion engine comprising a turbocharger housing, a stationary support fixedly mounted to said turbocharger housing and having a bore formed therethrough, a shaft extending through said bore and having a turbine end adapted to be secured to a turbine wheel and a compressor end adapted to be secured to a compressor wheel, a floating bearing support mounted in said bore for supporting the radial and axial thrust loads of the shaft wheels, said floating bearing support including a hydrodynamic sleeve bearing adjacent the turbine end of said shaft for supporting the radial load at the turbine end of said shaft, an anti-friction bearing support connected with said hydrodynamic sleeve bearing adjacent the compressor end of said shaft, and an anti-friction bearing having a thermal coefficient of expansion which is substantially less than the thermal coefficient of expansion of the anti-friction bearing mounted in the support and connected to the shaft to support the axial thrust load and the radial load of the compressor end of the shaft, wherein said anti-friction bearing support includes:
   (a) an interior cavity for receiving said anti-friction bearing, said interior cavity dimensions and the exterior dimensions of said anti-friction bearing being formed within known manufacturing tolerances to produce a predetermined interference fit between said anti-friction bearing and said interior cavity, said anti-friction bearing support including a planar wall and a plurality of segments mounted in cantilevered fashion to said planar wall, said segments having inside arcuate surfaces which define said interior cavity, said anti-friction bearing support having two pairs of opposed parallel exterior surfaces and containing four elongated slots separating said segments and being parallel to the longitudinal axis of said interior cavity and being arranged generally perpendicularly to said exterior surfaces, respectively, (b) expansion control means surrounding said interior cavity for causing the interior surface of said interior cavity to grip radially the exterior of said anti-frictional bearing to prevent relative rotational movement between said anti-friction bearing support and the exterior of said anti-friction bearing throughout a large operating temperature range without imposing a radial compressive force on the anti-friction element which would be sufficient to render said anti-friction bearing inoperative, and (c) retention means for preventing relative axial movement of the outer race and said bearing support.

3. A hybrid bearing assembly for supporting a high speed shaft on a base through an anti-friction bearing having an inner race and an outer race separated by anti-frictional elements having a predetermined working clearance and having an exterior dimension which is within a known manufacturing tolerance, comprising:

(a) a stationary support adapted to be rigidly connected with the base, (b) a floating bearing support hydrodynamically supported within said stationary support for limited rotational movement due to differences in the geometric and mass centers of rotation of the shaft and being formed of material having a thermal coefficient of expansion which is greater than the thermal coefficient of expansion of the outer race, said floating bearing support including:

(1) a hydrodynamic sleeve bearing for supporting one end of the shaft structure for rotation within said stationary bearing support, (2) a planar wall and a plurality of segments mounted in cantilevered fashion to said planar wall, said segments having inside arcuate surfaces defining an interior cavity shaped to form an interference fit with the exterior of the outer race within a predetermined manufacturing tolerance, and (3) expansion control means surrounding said interior cavity, for causing the surface of said interior cavity to grip radially the outer race with a sufficient frictional force to prevent relative rotational movement between said floating bearing support and the outer race throughout an operating temperature range spanning an excess of 400° F. without imposing on the outer race a radial compressive force sufficient to eliminate the predetermined working clearance between the inner and outer races, (4) said hydrodynamic sleeve bearing including a generally cylindrical extension connected to the opposite side of said planar wall from said cantilevered segments, said cylindrical extension including an inside cylindrical surface shaped to form a first predetermined clearance space with respect to a corresponding portion of the exterior of said shaft and further including an outside cylindrical surface shaped to form a second predetermined clearance with a corresponding portion of said stationary support and further including a hydrodynamic fluid supply means for providing a hydrodynamic fluid to said first and second clearance spaces, and (5) said hydrodynamic fluid supply means including a longitudinal groove contained in the exterior of said cylindrical extension, a first radial passage in said cylindrical extension communicating at one end with said longitudinal groove and at the other end with said first clearance space, a circumferential groove on the exterior of said cylindrical exterior communicating with said longitudinal groove and said second clearance space, and a source of hydrodynamic fluid contained in said stationary support for supplying hydrodynamic fluid to said circumferential groove, and (c) retention means for preventing relative axial movement of the outer race and said bearing support.

4. A turbocharger assembly for an internal combustion engine comprising a turbocharger housing, a stationary support fixedly mounted to said turbocharger housing and having a bore formed therethrough, a shaft extending through said bore and having a turbine end adapted to be secured to a turbine wheel and a compressor end adapted to be secured to a compressor wheel, a floating bearing support mounted in said bore for supporting the radial and axial thrust loads of the shaft wheels, said floating bearing support including a hydrodynamic sleeve bearing adjacent the turbine end of said shaft for supporting the radial load at the turbine end of said shaft, an anti-friction bearing support connected with said hydrodynamic sleeve bearing adjacent the compressor end of said shaft, and an anti-friction bearing having a thermal coefficient of expansion which is substantially less than the thermal coefficient of expansion of the anti-friction bearing mounted in the support and connected to the shaft to support the axial thrust load and the radial load of the compressor end of the shaft, wherein said anti-friction bearing support includes:

(a) an interior cavity for receiving said anti-friction bearing, said interior cavity dimensions and the exterior dimensions of said anti-friction bearing being formed within known manufacturing tolerances to produce a predetermined interference fit between said anti-friction bearing and said interior cavity, (b) expansion control means surrounding said interior cavity, including a planar wall and a plurality of segments mounted in cantilevered fashion to said planar wall, said segments having inside arcuate surfaces which define said interior cavity, for causing the interior surface of said interior cavity to grip radially the exterior of said anti-friction bearing to prevent relative rotational movement between said antifriction bearing support and the exterior of said antifriction bearing thoughout a large operating temperature range without imposing a radial compressive force on the anti-friction element which would be sufficient to render said anti-friction bearing inoperative, (c) said hydrodynamic sleeve bearing including a generally cylindrical extension connected to the opposite side of said planar wall from said cantilevered segments, said cylindrical extension including an inside cylindrical surface shaped to form a first predetermined clearance space with respect to a corresponding portion of the exterior of said shaft and further including an outside cylindrical surface shaped to form a second predetermined clearance with a corresponding portion of said stationary support and further including a hydrodynamic fluid supply means for providing a hydrodynamic fluid to said first and second clearance spaces, and (d) said hydrodynamic fluid supply means including a longitudinal groove contained in the exterior of said cylindrical extension, a first radial passage in said cylindrical extension communicating at one end with said longitudinal groove and at the other end with said first clearance space, a circumferential groove on the exterior of said cylindrical exterior communicating with said longitudinal groove and said second clearance space, and a source of hydrodynamic fluid contained in said stationary support for supplying hydrodynamic fluid to said circumferential groove, and (e) retention means for preventing relative axial movement of the outer race and said bearing support.

5. An assembly as defined in claims 3 or 4, wherein said cylindrical extension includes an interior recess surrounding said shaft which forms a flow path communicating with said interior cavity and wherein said hydrodynamic supply means includes a second radial passage contained within said cylindrical extension communicating at one end with said longitudinal groove and at the other end with said interior recess.

6. An assembly as defined in claim 5, wherein said interior recess communicates with the space between the inner and outer race of said anti-friction bearing when positioned in said interior cavity and wherein said anti-friction bearing support contains a drain passage communicating at one end with said relief groove in said interior cavity and at the other end with the exterior of said anti-friction bearing support.

7. An assembly as defined by claim 6, wherein the outer race of the anti-friction bearing adapted to be placed within said interior cavity includes a radial slot for fluid to flow from the space between the inner and outer race to said relief groove.

* * * * *